United States Patent
Carpigiani De Almeida et al.

(10) Patent No.: US 11,549,634 B2
(45) Date of Patent: Jan. 10, 2023

(54) FLEXIBLE PIPE CONNECTOR SUITABLE FOR EFFECTING CONTROL AND FORCED CIRCULATION OF ANTICORROSIVE FLUIDS THROUGH THE ANNULUS OF THE FLEXIBLE PIPE

(71) Applicant: PETRÓLEO BRASILEIRO S.A.—PETROBRAS, Rio de Janeiro (BR)

(72) Inventors: Marcos Carpigiani De Almeida, Rio de Janeiro (BR); George Carneiro Campello, Rio de Janeiro (BR); Jonatas Ribeiro, Rio de Janeiro (BR); Rafael Guimarães De Mello Sobreira, Rio de Janeiro (BR); Walter Carrara Loureiro Junior, Rio de Janeiro (BR); Marcelo Torres Piza Paes, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 615 days.

(21) Appl. No.: 16/618,693

(22) PCT Filed: May 30, 2018

(86) PCT No.: PCT/GB2018/051459
§ 371 (c)(1),
(2) Date: Dec. 2, 2019

(87) PCT Pub. No.: WO2018/220357
PCT Pub. Date: Dec. 6, 2018

(65) Prior Publication Data
US 2020/0096150 A1   Mar. 26, 2020

(30) Foreign Application Priority Data

May 30, 2017 (BR) .......................... 2017 011388-4

(51) Int. Cl.
*F16L 33/01* (2006.01)
*F16L 58/18* (2006.01)
(Continued)

(52) U.S. Cl.
CPC ............ *F16L 58/18* (2013.01); *E21B 17/085* (2013.01); *E21B 41/02* (2013.01); *F16L 33/01* (2013.01); *Y10T 29/49826* (2015.01)

(58) Field of Classification Search
CPC .......... F16L 33/01; F16L 55/18; E21B 41/02; E21B 17/085
(Continued)

(56) References Cited

U.S. PATENT DOCUMENTS

| 8,096,589 B2 | 1/2012 | De Aquino et al. |
| 10,018,292 B2 | 7/2018 | Espinasse et al. |

(Continued)

FOREIGN PATENT DOCUMENTS

| EP | 1867906 A1 | 12/2007 |
| EP | 1867905 B1 | 3/2013 |

(Continued)

OTHER PUBLICATIONS

International Search Report issued in corresponding Application No. PCT/GB2018/051459, dated Oct. 8, 2018 (3 pages).
(Continued)

*Primary Examiner* — Zachary T Dragicevich
*Assistant Examiner* — William S. Choi
(74) *Attorney, Agent, or Firm* — Osha Bergman Watanabe & Burton LLP

(57) ABSTRACT

A flexible pipe connector for effecting control and forced circulation of corrosion-inhibiting fluids through an annulus between inner and outer sheaths of a flexible pipe having multiple connected segments includes an attachment mechanism for connecting to an end of a segment of flexible pipe and at least two distributing rings for distributing corrosion-inhibiting fluid. The rings are configured to be positioned in the annulus of the flexible pipe, wherein at least one distributing ring has fluidic access to the annulus of the flexible
(Continued)

pipe. This distributing ring is configured to be connected fluidically to at least one distributing ring, in an adjacent connector, that does not have fluidic access to the annulus, A distributing ring that does not have fluidic access to the annulus of the flexible pipe is configured to be connected fluidically to at least one distributing ring, in an adjacent connector, that comprises fluidic access to the annulus.

12 Claims, 11 Drawing Sheets

(51) Int. Cl.
  *E21B 17/08* (2006.01)
  *E21B 41/02* (2006.01)
(58) Field of Classification Search
  USPC .......... 285/222.1, 222.2, 222.3, 222.4, 222.5
  See application file for complete search history.

(56) References Cited

U.S. PATENT DOCUMENTS

| | | |
|---|---|---|
| 2011/0109079 A1 | 5/2011 | Hegler et al. |
| 2013/0068465 A1 | 3/2013 | Critsinelis et al. |

FOREIGN PATENT DOCUMENTS

| | | |
|---|---|---|
| WO | 2008037867 A1 | 4/2008 |
| WO | 2010067092 A1 | 6/2010 |
| WO | 2012022908 A1 | 2/2012 |
| WO | 2012126999 A1 | 9/2012 |
| WO | 2014174244 A1 | 10/2014 |
| WO | 2015121616 A1 | 8/2015 |
| WO | 2016092282 A1 | 6/2016 |

OTHER PUBLICATIONS

Written Opinion issued in corresponding Application No. PCT/GB2018/051459, dated Oct. 8, 2018 (8 pages).

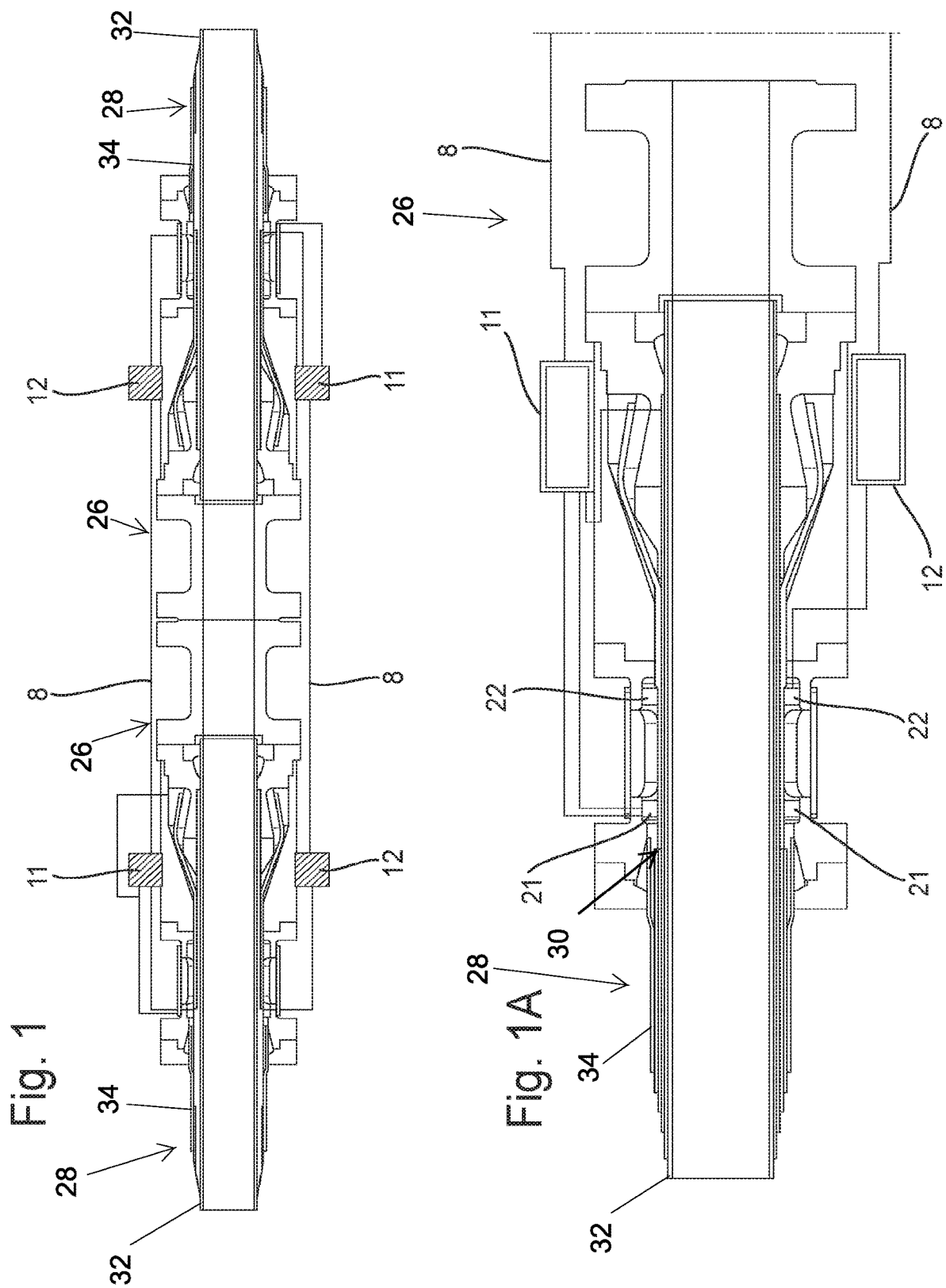

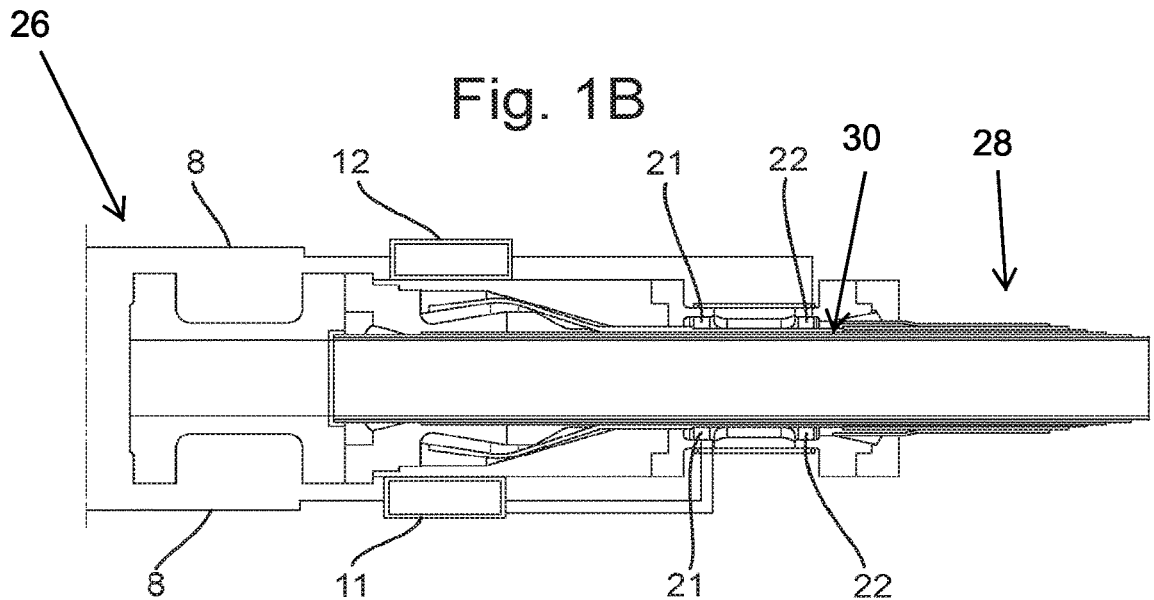
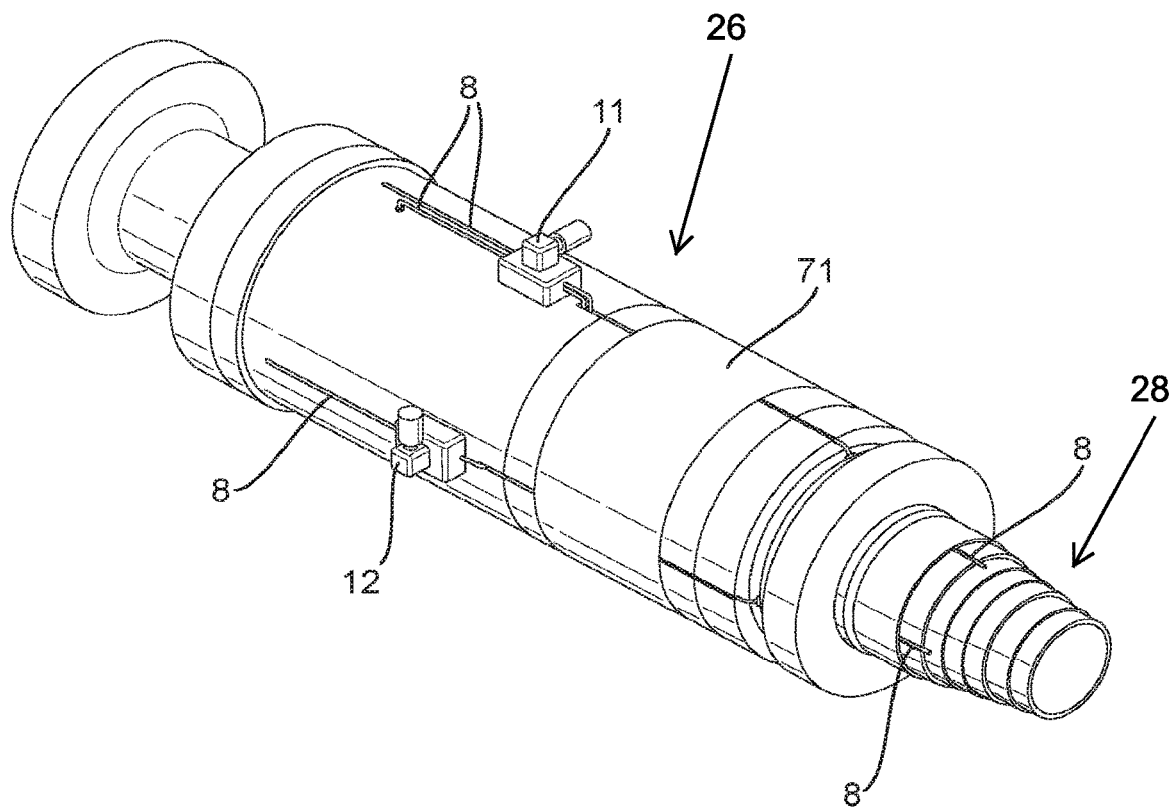

FLEXIBLE PIPE CONNECTOR SUITABLE FOR EFFECTING CONTROL AND FORCED CIRCULATION OF ANTICORROSIVE FLUIDS THROUGH THE ANNULUS OF THE FLEXIBLE PIPE

CROSS-REFERENCE TO RELATED APPLICATION

This application claims the benefit of priority to BR 10 2017 011388-4, filed 30 May 2017, which is incorporated herein by reference in its entirety.

FIELD OF THE INVENTION

The present invention relates to pipeline and riser technologies. More particularly, the present invention relates to connectors of pipelines with a system for control and forced circulation of fluids through the annulus of the pipeline.

BACKGROUND OF THE INVENTION

Petroleum production in the offshore environment makes wide use of ascending pipelines, known as risers. Such a pipeline, which may be flexible or rigid, collects the oil produced by the subsea well, and conveys it to a floating unit, and then to tankers or directly to onshore facilities.

Flexible pipes of the "unbonded" type designed according to standards API Spec 17J and API RP 17B, the descriptions of which are incorporated herein by reference, possess armouring normally constructed of carbon steel and carbon-manganese steel, which is confined within the annulus between two permeable polymer layers, the first layer (referred to as the "barrier") for isolating the fluid conveyed inside the pipe and the second for isolating the surroundings (referred to as the "outer sheath" or "outer cover"). That is, the barrier and outer cover can be considered to be inner and outer sheaths of the pipe. The term "annulus" is used through the present document to refer this space between the barrier and the outer cover.

The armouring is susceptible to corrosion by corrosive gases ($CO_2$ and $H_2S$) and water that permeates from inside the pipe, through the polymer of the barrier. Any loss of hermeticity of the outer sheath also results in the presence of water in the annulus.

Corrosion may lead to failure mechanisms, such as stress corrosion—caused by $CO_2$ or by $H_2S$—and pitting corrosion. Stress corrosion caused by $CO_2$ (SC—$CO_2$) is a failure mechanism that is not covered by the current versions of the international standards for flexible pipes (API Spec 17J and ISO-13628-2). The contents of standard ISO-13628-2 are also relevant and incorporated herein by reference.

At present, flexible pipes are normally constructed without an integrated system (to the pipe body and connectors) for forced circulation with the annulus between the outer cover and the barrier, which would make it possible to displace the corrosive gases that may be present in its annulus, so as to reduce their concentration or fugacity and prevent or minimize their corrosive effects.

In some cases in the oil industry, the various sections or segments of a flexible pipe, which are provided with flanges at their ends, have their annular spaces interconnected so as to allow a reduction in the concentrations of the corrosive gases. However, this conventional technical solution is not sufficient to prevent corrosion due to condensation of water in the annulus or loss of integrity of the annulus through ingress of sea water. In general, the annular space is very restricted, making circulation of the gases that have permeated and of other fluids difficult. Consequently, removal or dilution to acceptable levels of corrosive fluids also becomes difficult, if forced circulation is not used or there is no change in the design features of the flexible pipe.

The flexible pipes currently on the market have layers on their annulus that make circulation of fluids difficult, and in which droplets or bubbles of $CO_2$ with dissolved water may be trapped owing to the geometric characteristics both of some metallic layers (for example, "Z-shape", "T-shape" or "C-shape" layers, as shown in FIG. 7 of the practical recommendations API RP 17B) and in the interstices between metallic and polymer layers, or else in elements arranged between these layers, such as anti-wear tapes or anti-buckling tapes.

Document US20130068465A1, for example, discloses a method for circulation of fluids through the annulus of a flexible riser, which requires the use of an umbilical with a pipe for allowing circulation of, for example, corrosion inhibitor in the annulus. However, that document does not provide changes in the structure of the flexible pipe or connectors necessary to allow mitigation of the problems of corrosion in the armouring of the flexible pipe, such as SC—$CO_2$ and pitting corrosion. The document only contemplates a single continuous riser, rather than a riser consisting of several segments.

As such, document US20130068465A1 does not consider how to mitigate corrosion in the armouring of the flexible pipe in the case of loss of hermeticity of the annulus, for example due to damage in the outer sheath in an area (e.g. a particular segment, when the flexible pipe is made up of several segments). In such a scenario, the circulation will be interrupted in the area in which the annulus becomes flooded with sea water. Moreover, the method taught by US20130068465A1 requires additional support on the platform for each riser to be serviced by the umbilicals.

Document EP1867906A1 relates to an apparatus and a method for providing a connector for a flexible pipe. The document relates to a method of assembly and apparatus used during connection of the connector to the flexible pipe in which the body of the connector is pushed onto the body of the flexible pipe.

Document EP1867905B1 relates to an apparatus and a method for providing a flexible pipe connector. In particular, this document refers to an internal and/or external collar of a flexible pipe, wherein at least one of them includes a shaped surface for controlling a radius of curvature of wires of an armouring layer of the flexible pipe when the flexible pipe body is mounted in a connector.

Document WO2008037867A1 relates to a connector for a flexible pipe having increased resistance to pulling-out of the pipe.

Document US2011109079A1 relates to a method and apparatus for fixing a flexible pipe to another flexible pipe. In particular, this document relates to a method for joining flexible pipe segments together to form a duct in which the gases trapped in an annular region of a flexible pipe, in a portion of the pipeline, may be transferred to a corresponding annular region in some other part or parts of the pipeline.

Document WO2012022908A1 describes a connector for joining a flexible pipe for transporting a cryogenic fluid comprising a corrugated inner pipe, at least one layer of tensile armour arranged around the corrugated pipe, at least one layer of thermal insulation arranged around the armouring layer, and an outer sealing layer arranged around the layer of thermal insulation. The connector in this document further comprises a front part that comprises, on the one hand, a front end flange for holding the corrugated pipe in its defined place and, on the other hand, elements for fastening the armouring layer. The connector also comprises a rear part comprising at least one rear end flange for exerting pressure on the outer layer and for holding the layer of thermal insulation in place, the front and rear ends respectively being joined together by coupling elements. Finally, the connector described comprises means for thermal insulation interposed between the front end flange and rear end flange, respectively, so as to isolate the rear part from the front part of the connector.

Document WO2012126999A1 describes a connector of a flexible pipe for conveying a fluid in a marine environment, wherein the flexible pipe is of the unbonded type used for offshore exploration of oil and gas reservoirs.

This document also relates to a method for connecting a connector of the type described at one end of a flexible pipe of the unbound type.

Document WO2014174244A1 relates to a method and an apparatus for fixing a flexible pipe body in a connector. In particular, this document describes the use of a sealing ring for providing a fluid seal between a polymer layer of the flexible pipe body and the connector.

Finally, document WO2016092282A1 relates to a flexible pipe connector, and an apparatus and a method for making a flexible pipe connector. This document gives details of the manufacture of a connector for a flexible pipe, wherein at least one component part of the connector is formed first as a near net shape (NNS) precursor, the shape of which approximates to the final shape, by means of an additive process, and is then finished to supply the component part.

It is therefore clear that the prior art does not comprise connectors for flexible pipes that provide control and access to the annulus of the flexible pipe, to allow forced circulation of $N_2$ or of other non-corrosive fluids through this annulus, so as to minimize the corrosive effects mentioned above, caused by the presence of water and undesirable gases, such as $CO_2$ or $H_2S$.

As will be described in more detail below, the present invention aims to solve the problems of the prior art described above in a practical and efficient manner.

SUMMARY OF THE INVENTION

It is thus desirable to provide a connector for flexible pipes that allows access and control of the annulus of the flexible pipe, to allow forced circulation of corrosion-inhibiting fluids, such as $N_2$ or other non-corrosive fluids, through this annulus, so as to minimize the corrosive effects mentioned above, caused by the presence of water and undesirable gases, such as $CO_2$ or $H_2S$.

According to the present invention there is provided a flexible pipe connector suitable for effecting control and forced circulation of corrosion-inhibiting fluids through an annulus between inner and outer sheaths of a flexible pipe comprising multiple connected segments, the flexible pipe connector comprising one or more of: an attachment mechanism for connecting to an end of a segment of flexible pipe: at least two distributing rings for distributing corrosion-inhibiting fluid, the at least two rings configured to be positioned in the annulus of the flexible pipe; wherein at least one distributing ring has fluidic access to the annulus of the flexible pipe, this distributing ring being configured to be connected fluidically to at least one distributing ring, in an adjacent connector, that does not have fluidic access to the flexible pipe annulus; and at least one distributing ring that does not have fluidic access to the annulus of the flexible pipe, this distributing ring being configured to be connected fluidically to at least one distributing ring, in an adjacent connector, that comprises fluidic access to the flexible pipe annulus. The two distributing rings allow for corrosion-inhibiting fluid to be distributed or collected within a particular pipe segment, whilst also allowing that fluid to be communicated to adjacent segments of the pipe.

Optionally, the connector further comprises one or more of: a first manifold configured to control the flow of corrosion-inhibiting fluid to or through the at least one distributing ring of the connector having fluidic access to the annulus of the flexible pipe; and a second manifold configured to control the flow of corrosion-inhibiting fluid to or through the at least one distributing ring of the connector that does not have fluidic access to the annulus of the flexible pipe.

Optionally, the distributing ring of the connector that does not have access to the annulus of the flexible pipe is in fluid communication with two fluidic communication channels, which are configured for fluidic communication with two adjacent flexible pipe connectors.

Optionally, the distributing ring of the connector that comprises access to the annulus comprises two annular chambers, wherein: a first annular chamber is configured to be in fluid communication with: a fluidic communication channel that is configured to be connected to an adjacent connector; at least one collecting or injection pipe; and the first manifold; and the second annular chamber is configured to be in fluid communication with: the first manifold; and with the annulus of the flexible pipe via holes in one face.

Optionally, the second manifold comprises channels configured for fluidic communication with a first manifold of an adjacent connector; and the first manifold comprises channels configured for fluidic communication with a second manifold of an adjacent connector.

Optionally, the flexible pipe connector further comprises an access hatch.

Optionally, the flexible pipe connector further comprises a removable cover for the access hatch.

Optionally, the manifolds are suitable for being actuated by a remotely operated underwater vehicle.

Optionally, the flexible pipe connector further comprises at least one access channel for injection or collection of corrosion-inhibiting fluid inside said connector.

Optionally the distributing ring of the connector that does not have access to the annulus comprises an annular chamber, a communication channel with the second manifold and one or more of: at least one injection pipe 4 connected to one face; at least one collecting pipe 4 connected to one face; ducts fluidically connecting the annular chamber to an auxiliary annular chamber; and at least one collecting or injection pipe connected to at least one extension of the annular chamber, wherein the collecting or injection pipes are distributed helicoidally along the tensile armour of the flexible pipe.

Optionally, the flexible pipe connector further comprises a protective element that comprises one of: a clamping ring configured to be fixed to the end of the flexible pipe near the connector, and a clamping ring fixed to the opposite end of the connector; and a clamping ring configured to be fixed to the end of the flexible pipe near the connector, and a clamping ring configured to be fixed to an end of a flexible pipe near an adjacent connector; wherein the clamping rings are connected via protecting bars distant from the connector, and plates for laying on the seabed are fixed on the protecting bars.

According to another aspect, there is provided a method of connecting segments of flexible pipe to effect control and forced circulation of corrosion-inhibiting fluids through an annulus between inner and outer sheaths of the flexible pipe the method comprising one or more of: attaching an end of a segment of flexible pipe to a first connector, including positioning two distributing rings of the first connector, for distributing corrosion-inhibiting fluid, in the annulus of the flexible pipe segment; wherein one distributing ring has fluidic access to the annulus of the flexible pipe, and the method further comprises connecting this distributing ring fluidically to a distributing ring in an adjacent connector, the distributing ring in an adjacent connector not having fluidic access to the flexible pipe annulus; and wherein the other distributing ring does not have fluidic access to the annulus of the flexible pipe, and the method further comprises connecting this distributing ring fluidically to another distributing ring in an adjacent connector, the another distributing ring in an adjacent connector having fluidic access to the flexible pipe annulus.

According to an aspect of the disclosure, there is provided a flexible pipe connector suitable for effecting control and forced circulation of corrosion-inhibiting fluids through the annulus of the flexible pipe comprising means for connecting to a flexible pipe. The connector additionally comprises at least two rings for distributing corrosion-inhibiting fluid positioned in the annulus of the flexible pipe, wherein: at least one distributing ring comprises fluidic access to the annulus of the flexible pipe, wherein this distributing ring is connected fluidically to at least one distributing ring that does not have fluidic access to the flexible pipe annulus of at least one adjacent connector; and at least one distributing ring does not have fluidic access to the annulus of the flexible pipe, this distributing ring being connected fluidically to at least one distributing ring that comprises fluidic access to the flexible pipe annulus of at least one adjacent connector.

According to another aspect of the disclosure, there is provided a flexible pipe connector suitable for effecting control and forced circulation of corrosion-inhibiting fluids through the annulus of the flexible pipe comprising means for connecting to a flexible pipe, characterized in that it comprises at least two rings for distributing corrosion-inhibiting fluid positioned in the annulus of the flexible pipe, wherein: at least one distributing ring comprises fluidic access to the annulus 21 of the flexible pipe, this distributing ring 21 being connected fluidically to at least one distributing ring that does not have fluidic access to the flexible pipe annulus of at least one adjacent connector; and at least one distributing ring does not have fluidic access to the annulus 22 of the flexible pipe, this distributing ring being connected fluidically to at least one distributing ring that comprises fluidic access to the flexible pipe annulus of at least one adjacent connector.

Optionally the flexible pipe connector is characterized in that it comprises: a first manifold 11 suitable for controlling the flow of corrosion-inhibiting fluid to or through the at least one distributing ring that comprises fluidic access to the annulus 21 of the flexible pipe; and a second manifold 12 suitable for controlling the flow of corrosion-inhibiting fluid to or through the at least one distributing ring that does not have fluidic access to the annulus 22 of the flexible pipe.

Optionally the flexible pipe connector is characterized in that the distributing ring that does not have access to the annulus 22 of the flexible pipe is in fluid communication with two fluidic communication channels 8, which are suitable for fluidic communication with two adjacent flexible pipe connectors.

Optionally the flexible pipe connector is characterized in that the distributing ring that comprises access to the annulus 21 comprises two annular chambers 211,212, wherein: a first annular chamber 211 is in fluid communication with: a fluidic communication channel 8 that is connected to an adjacent connector; at least one collecting or injection pipe 4; and the first manifold 11; and the second annular chamber 212 is in fluid communication with: the first manifold 11; and with the annulus of the flexible pipe via holes 216 in one face.

Optionally the flexible pipe connector is characterized in that: the second manifold 12 comprises channels 8 for fluidic communication with a first manifold 11 of an adjacent connector; and the first manifold 11 comprises channels 8 for fluidic communication with a second manifold 12 of an adjacent connector.

Optionally the flexible pipe connector is characterized in that it comprises a peep hole 70 with a removable cover 71.

Optionally the flexible pipe connector is characterized in that the manifolds 11,12 are suitable for being actuated by a remotely operated underwater vehicle.

Optionally the flexible pipe connector is characterized in that it comprises at least one access channel 80 for injection or collection of corrosion-inhibiting fluid inside said connector.

Optionally the flexible pipe connector is characterized in that the distributing ring that does not have access to the annulus 22 comprises an annular chamber 220, a communication channel 8 with the second manifold 12 and at least one of: at least one injection pipe 4 connected to one face; at least one collecting pipe 4 connected to one face; a main annular chamber 220 connected fluidically via small ducts 223 to an auxiliary annular chamber 221; and at least one collecting or injection pipe 4 connected to at least one extension 224 of the main annular chamber 220, wherein the collecting or injection pipes 4 are distributed helicoidally along the tensile armour of the flexible pipe.

Optionally the flexible pipe connector is characterized in that it comprises a protective element 9 that comprises one of: a clamping ring 90 fixed to the end of the flexible pipe near the connector, and a clamping ring 90 fixed to the opposite end of the connector; and a clamping ring 90 fixed to the end of the flexible pipe near the connector, and a clamping ring 90 fixed to the end of the flexible pipe near the connector exactly adjacent to the first, wherein the clamping rings are connected via protecting bars 91 distant from the connector, and plates 92 for laying on the seabed are fixed on the protecting bars 91.

BRIEF DESCRIPTION OF THE FIGURES

The detailed description presented hereunder refers to the appended figures and their respective reference numbers.

FIG. 1 shows two adjacent flexible pipe connectors suitable for effecting control and forced circulation of corrosion-inhibiting fluids through the annulus of the flexible pipe according to an optional configuration.

FIGS. 1A and 1B show schematically a first and a second flexible pipe connector as shown in FIG. 1.

FIG. 2 shows a perspective view of a flexible pipe connector according to an optional configuration.

DETAILED DESCRIPTION OF THE INVENTION

Figure 3:
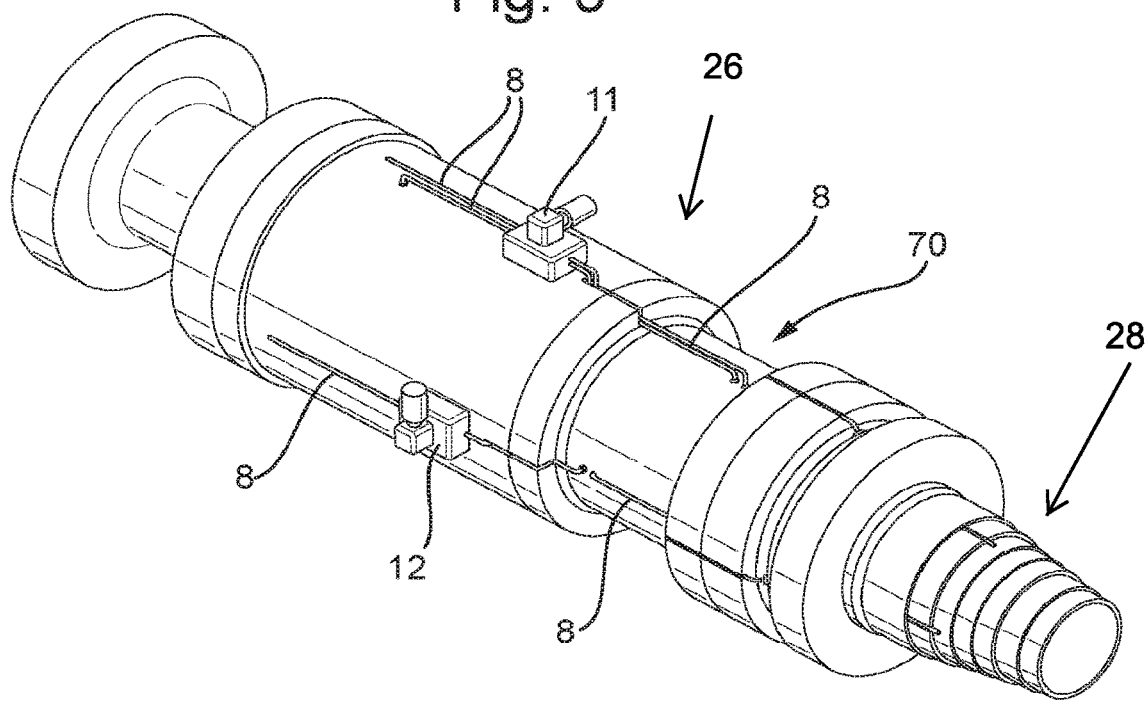
FIG. 3 shows a perspective view of a flexible pipe connector according to an optional configuration, in which the access hatch is shown in its opened configuration.

First, it is emphasized that the following description is based on a preferred embodiment. However, as will be obvious to a person skilled in the art, the invention is not limited to this particular embodiment.

FIG. 1 shows two adjacent flexible pipe connectors 26 suitable for effecting control and forced circulation of corrosion-inhibiting fluids through the annulus 30 between inner and outer sheaths 32, 34 of the flexible pipe 28 according to an optional configuration of the present disclosure. FIGS. 1A and 1B show schematically a first and a second flexible pipe connector as shown in FIG. 1.

The flexible pipe connector 26 is suitable for effecting control and forced circulation of corrosion-inhibiting fluids through the annulus of the flexible pipe 28 described, and comprises means for connecting to a flexible pipe 28.

Various connecting means between connectors 26 and flexible pipes 28 are known from the prior art, so a person skilled in the art will not have any difficulty in selecting the best means for this. Thus, the present disclosure envisages the use of any available connecting means between a pipe 28 and an end connector 26.

The flexible pipe connector 26 comprises at least two rings 21, 22 for distributing corrosion-inhibiting fluid. In use, the rings 21, 22 can be positioned in the annulus 30 of the flexible pipe 28. At least one distributing ring 21 can comprise fluidic access to the annulus of the flexible pipe to which it is connected. At least one distributing ring 22 may not have fluidic access to the annulus 30 of the flexible pipe 28 to which it is connected.

The at least one distributing ring 21 that has fluidic access to the annulus 30 of the flexible pipe 28 can be connected fluidically (and not necessarily directly) to at least one distributing ring 22 that does not have fluidic access to the flexible pipe annulus 30 of at least one adjacent connector. That adjacent connector may be at the other end of the pipe segment concerned, or may be in another pipe segment connected via the connector in which the distributing ring 21 is provided.

In its turn, the at least one distributing ring 22 that does not have fluidic access to the annulus 30 of the flexible pipe can be connected fluidically (and not necessarily directly) to at least one distributing ring 21 that has fluidic access to the flexible pipe annulus 30 of at least one adjacent connector. That adjacent connector may be at the other end of the pipe segment concerned, or may be in another pipe segment connected via the connector in which the distributing ring 21 is provided.

In addition, each flexible pipe connector 26 can comprise a first manifold 11 suitable for controlling the flow of corrosion-inhibiting fluid to or through the annulus 30 of the flexible pipe 28. The pipe connector 26 can also comprise a second manifold 12 suitable for controlling the flow of corrosion-inhibiting fluid to or through the at least one distributing ring 22 that does not have fluidic access to the annulus 30 of the flexible pipe 28.

The distributing ring 22 that does not have fluidic access to the annulus 30 of the flexible pipe 28 does not allow corrosion-inhibiting fluid to be injected or collected from the annulus 30. Thus, this ring 22 functions as a support for the distributing ring 21 with access to the annulus 30 of a connector 26 adjacent thereto.

For this, the second manifold 12 comprises at least one channel 8 for fluid communication with an adjacent connector. In the adjacent connector, these channels 8 can be connected to the first manifold 11, which will control access of corrosion-inhibiting fluid to the distributing ring 21 with access to the annulus of the adjacent connector.

Conversely, the distributing ring 21 that comprises access to the annulus is arranged for injecting corrosion-inhibiting fluid into the annulus 30 of the flexible pipe 28 or for collecting corrosion-inhibiting fluid from the annulus of the flexible pipe. Thus, this ring 21 makes possible injection of corrosion-inhibiting fluid into the annulus 30 of the flexible pipe 28 or collection of this fluid from the same annulus 30 of the flexible pipe 28, as required.

For this, the first manifold 11 also comprises at least one channel 8 for fluid communication with an adjacent connector. In the adjacent connector 26, these channels 8 are connected to the second manifold 12, which will control access of corrosion-inhibiting fluid to the distributing ring 22 that does not have access to the annulus of the adjacent connector.

It is emphasized that what is described in the preceding paragraphs is provided for communication of the connector in question with up to two adjacent connectors. In the case shown in FIGS. 1, 1A, and 1B only one adjacent connector is actually shown. However, a connector as described may also be provided at the opposite end of the section of flexible pipe. Thus, in these cases, the channels 8 for fluid communication may be passed through said annulus of the flexible pipe. This configuration will be described later in this document.

Note that in this document the term distributing ring 21 that comprises fluidic access to the annulus 30 of the flexible pipe will also be referred to as distributing ring 21 with access to the annulus 30. Similarly, the term distributing ring 22 that does not have fluidic access to the annulus of the flexible pipe may be referred to as the distributing ring 22 without access to the annulus 30. Since these terms are synonymous, it is believed that this alternation will not cause any kind of confusion for the reader. It is also noted that the skilled reader will understand from the description herein that the distributing ring 21 with access to the annulus has direct access to the annulus, e.g. through holes 216. In contrast, it will also be understood that the distributing ring 22 without access to the annulus 30, although it may be fluidically connected (e.g. via other distributing rings) to the annulus, does not have direct access to the annulus (e.g. it has no equivalent to holes 216).

FIG. 2 shows a perspective view of a flexible pipe connector according to an optional configuration, in which its external elements can be seen. It is emphasized that the flexible pipe is shown with simplified sections of the layers, to facilitate visualization.

According to the configuration presented, the connector is provided with a access hatch 70. The access hatch 70 may have a cover 71 that may be used for observation and maintenance of the internal elements of the connector. This feature will be presented in more detail later in this specification.

In alternative configurations, the outside wall of the connector may comprise recesses in which the exposed pipes would be inserted and protected from impacts. Thus, the cover 71 of the access hatch 70 could be omitted.

FIG. 3 shows a perspective view of a flexible pipe connector according to an optional configuration of the present invention, in which the access hatch 70 is shown in its opened configuration, i.e. its cover 71 is omitted. It can be seen that opening the access hatch 70 gives access to the internal elements of the connector for maintenance and/or various checks that may be necessary.

Figure 4:
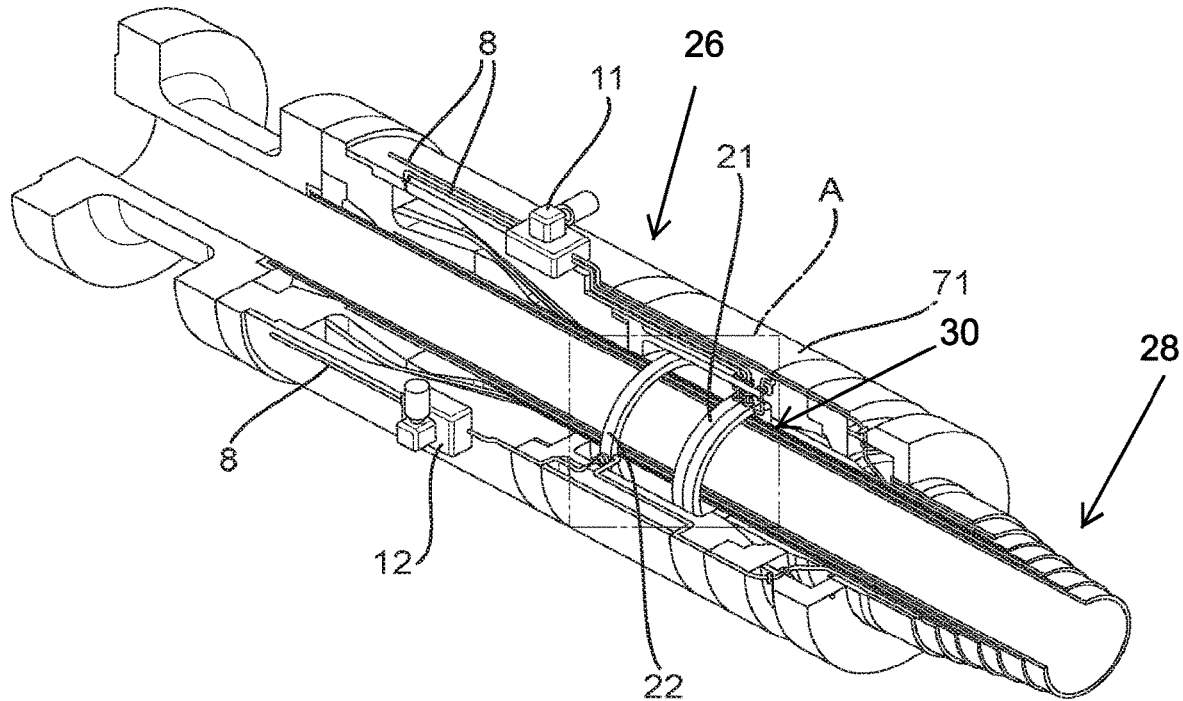
FIG. 4 shows a sectional view of a flexible pipe connector according to an optional configuration.

FIG. 4 shows a sectional view of a flexible pipe connector according to an optional configuration of the present invention. This shows more clearly the connections between the first manifold 11 and the distributing ring 21 that comprises access to the annulus 30, as well as between the second manifold 12 and the distributing ring 22 that does not have access to the annulus 30. All these communications are effected by means of the channels 8 for fluid communication, as described above.

Optionally, the manifolds 11, 12 are suitable for being actuated, for controlling the flow of corrosion-inhibiting fluid, by a remotely operated underwater vehicle (ROV, as it is widely known by persons skilled in the art) or by hydraulic operation from a stationary production unit (SPU).

It is emphasized that both the first manifold 11 and the second manifold 12 are suitable for controlling the flow of corrosion-inhibiting fluid independently for each segment (section) of flexible pipe to which the connector is connected.

Optionally, the first manifold 11 may be suitable for providing access to the annulus for injection, suction or sampling of fluids. If the first manifold 11 is to be operated remotely by ROV, as described above, the manifold 12 can be adapted for providing access to the annulus via the ROV, which may be adapted for performing operations of injection, suction or sampling of fluids.

Figure 5:
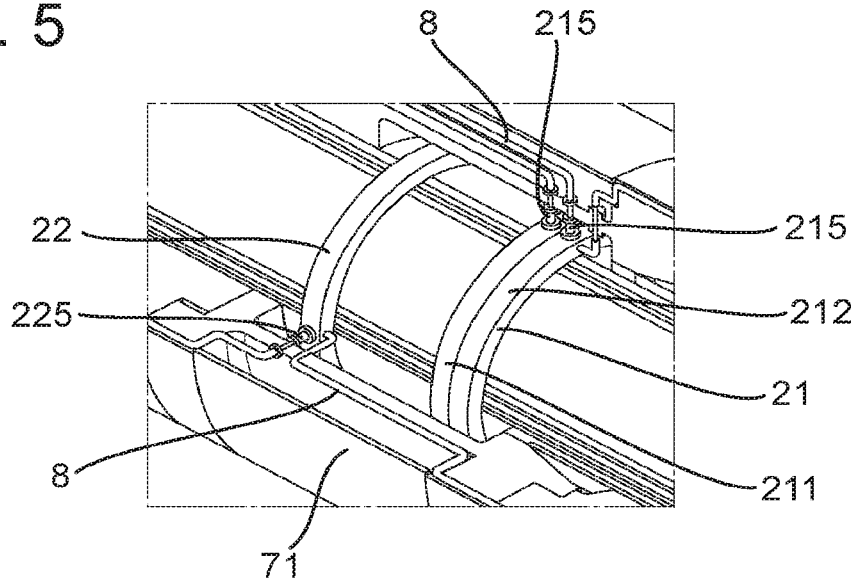
FIG. 5 shows a close-up view of detail A of the flexible pipe connector in FIG. 4.

FIG. 5 shows a close-up view of detail A of the flexible pipe connector in FIG. 4, illustrating the distributing rings 21, 22 with and without access to the annulus 30 in greater detail.

Referring to the distributing ring 22 without access to the annulus 30, it is noted that it is in fluid communication with two fluidic communication channels 8. These channels 8 allow the distributing ring 22 without access to the annulus 30 to communicate fluidically with two adjacent connectors. Since this distributing ring 22 does not have access to the annulus, the corrosion-inhibiting fluid remains trapped in the ring, so that the ring only acts as an aid in the communication of this fluid (as explained in more detail below, the distributing ring 22 is also connected to pipes 4 for transporting the corrosion-inhibiting fluid).

For its part, the distributing ring 21 with access to the annulus 30 may be divided into two annular chambers 211, 212. In this configuration, a first annular chamber 211 is in fluid communication with a fluidic communication channel 8 that is connected to the adjacent connector on the same pipe segment (e.g. as best shown in FIG. 6A, discussed below), and to the first manifold 11. It is also connected to pipes 4 for transporting the corrosion-inhibiting fluid, as explained in more detail below. In its turn, the second annular chamber 212 is also in fluid communication with the first manifold 11, and is in fluid communication with the annulus of the flexible pipe.

Fluid communication of the second annular chamber 212 with the annulus of the flexible pipe may be provided in various ways, including via holes 216 arranged radially on the distributing ring 21, or else via fluid injection pipes or fluid collecting pipes arranged longitudinally in the annulus of the flexible pipe.

Figure 6:
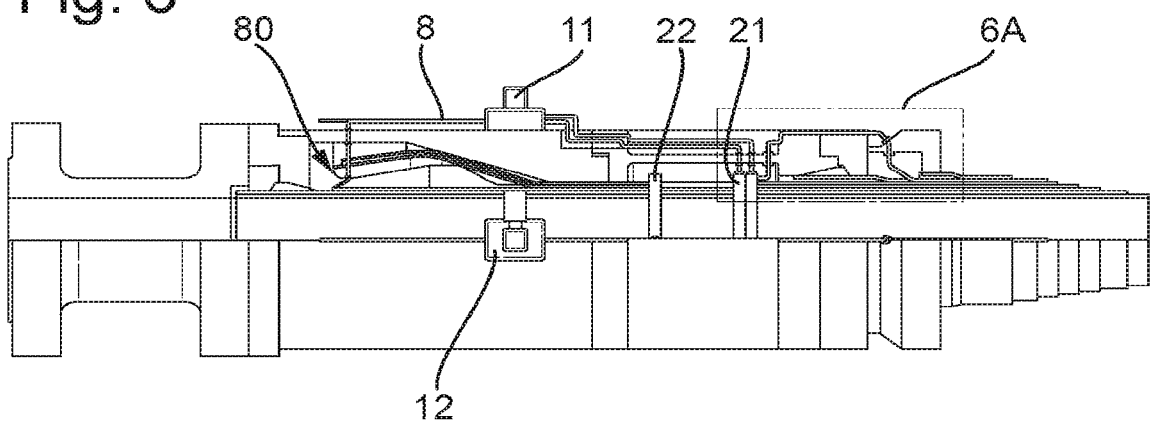
FIG. 6 shows a side view of the configuration of the flexible pipe connector shown in FIG. 4.
Figure 6A:
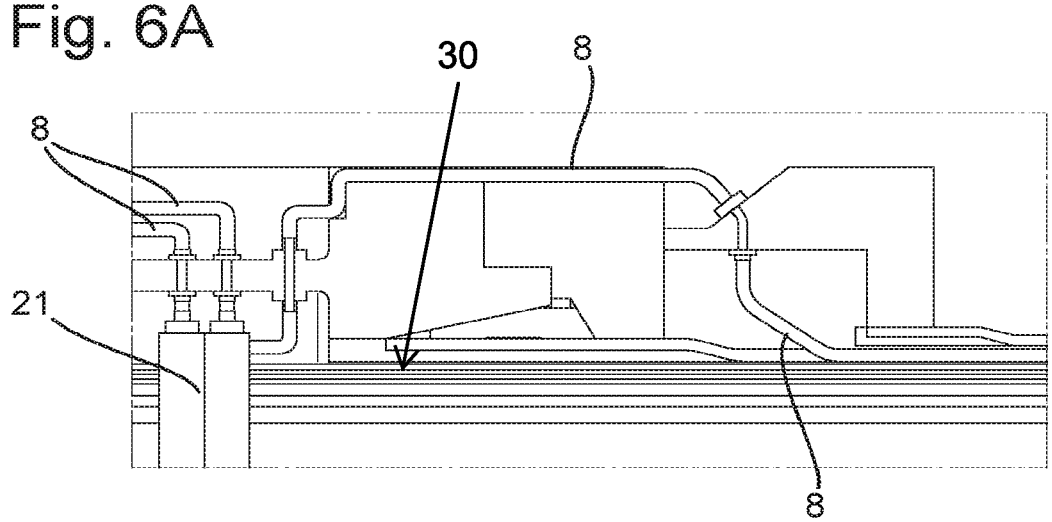
FIG. 6A shows detail 6A from FIG. 6.

FIG. 6 shows a side view of the configuration of the flexible pipe connector shown in FIG. 4. It can be seen more clearly here that the connector optionally comprises an access 80 for injection or collection of corrosion-inhibiting fluid to or from the interior of said connector. In the configuration shown, this access is provided by an access channel 80 connected to a fluidic communication channel 8, in its turn connected to the first manifold 11.

Thus, besides controlling access of corrosion-inhibiting fluid to the distributing ring 21 with access to the annulus 30, the first manifold 11 also controls access of this fluid to the interior of said connector. Thus, besides preventing corrosion in the internal elements of the annulus of the flexible pipe, the arrangement now described also aids corrosion prevention in the connector itself, which increases its reliability significantly, especially in comparison with the connectors of the prior art.

FIG. 6A shows detail 6A from FIG. 6. In this figure it can be seen in detail that the fluidic communication channel 8, which is connected to an adjacent connector at the other end of a pipe segment, and which starts from the first annular chamber 211 of the distributing ring, is optionally inserted under a protective layer of the flexible pipe 28. This channel 8 remains under the protective layer up to the adjacent connector 26, which will comprise the same elements as the connector 26 shown, so that the fluidic communication channel 8 can be connected to a distributing ring 22 that does not have access to the annulus 30, as already described in this document.

Figure 7:
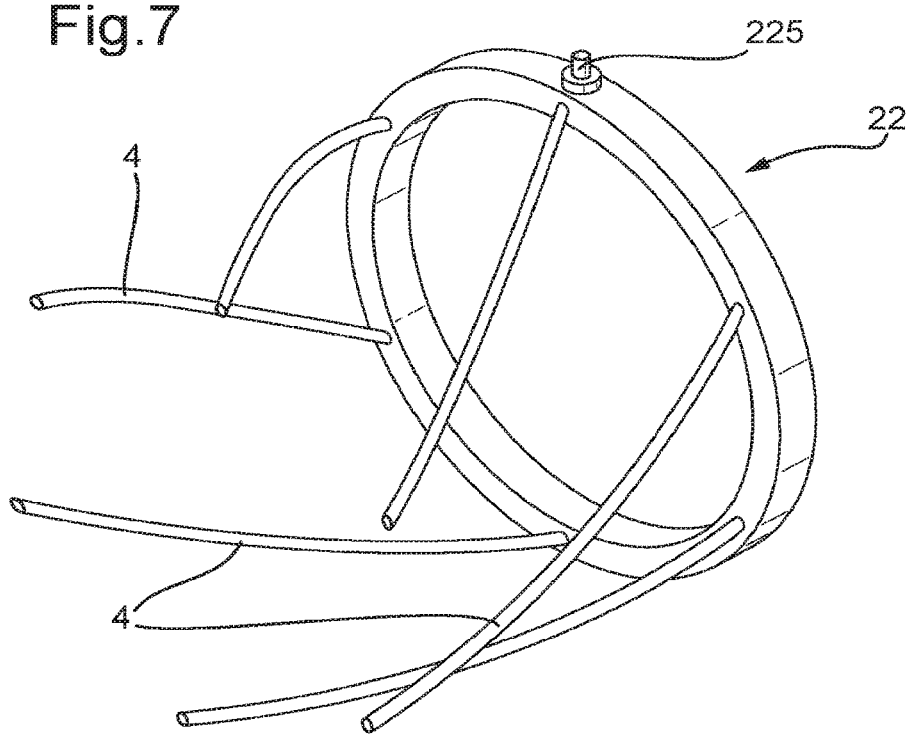
FIG. 7 shows a view of a first optional configuration of a distributing ring without access to the annulus.

FIG. 7 shows a view of a first optional configuration of a distributing ring 22 without access to the annulus 30 that comprises an annular chamber 220, a channel 225 for communication with the second manifold 12 and at least one injection pipe 4 connected to one face. Preferably, a number of collecting or injection pipes are connected to this face. For simplicity, no channel 8, for connecting to a distributing ring 21 with access to the annulus 30 in an adjacent connector, is shown.

Figure 7A:
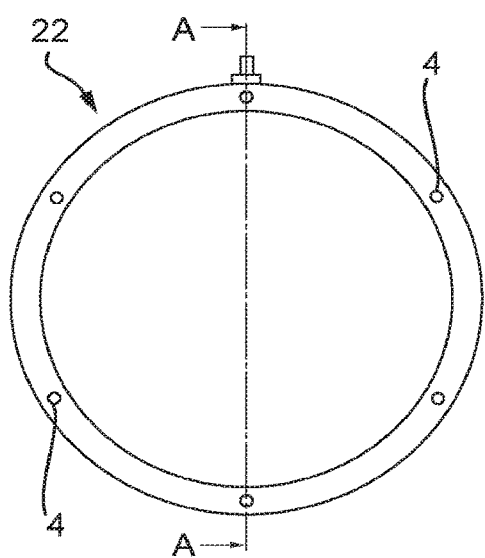
FIG. 7A shows a front view of the distributing ring without access to the annulus in FIG. 7.

FIG. 7A shows a front view (face that comprises the at least one connected injection pipe 4) of the distributing ring 22 without access to the annulus 30 in FIG. 7.

Figure 7B:
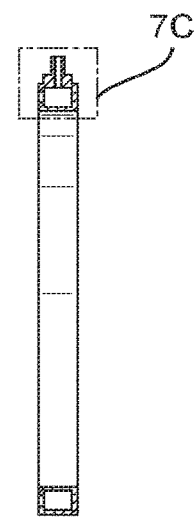
FIG. 7B shows a view of section AA of the distributing ring without access to the annulus indicated in FIG. 7A.
Figure 7C:
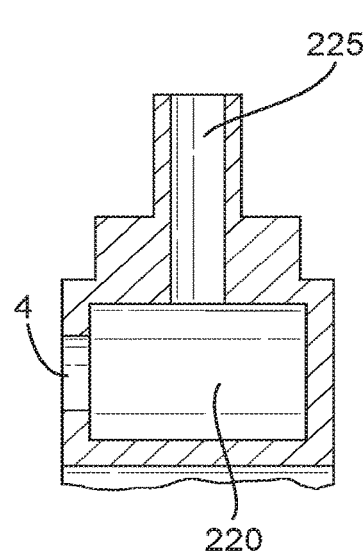
FIG. 7C shows a view of detail 7C of FIG. 7B.

FIG. 7B shows a view of section AA of the distributing ring 22 without access to the annulus 30 indicated in FIG. 7A, and FIG. 7C shows a view of detail 7C in FIG. 7B.

The rectangular format of the cross-section of the annular chamber 220 can be seen more clearly in these figures. It is emphasized that other formats may be employed, such as round, oval, etc.

Figure 7D:
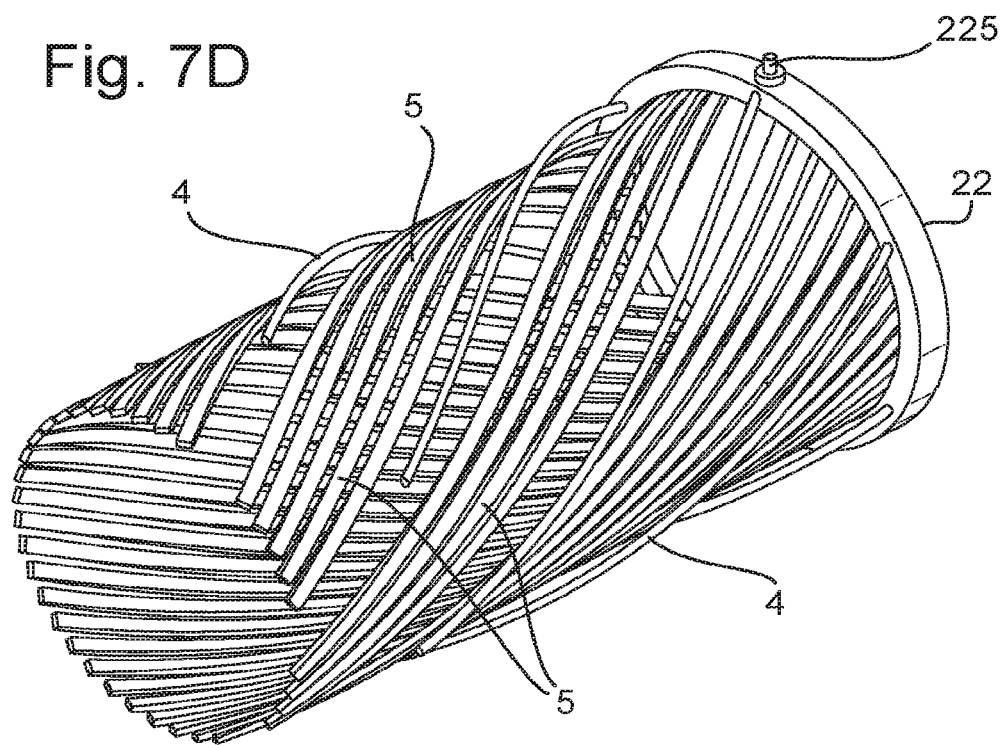
FIG. 7D shows a view of the distributing ring without access to the annulus of FIG. 7 in an optional application.

FIG. 7D shows a view of the distributing ring 22 without access to the annulus 30 in FIG. 7 in an optional application in which the pipes for injection or collection are distributed helicoidally along the tensile armour 5 of the flexible pipe. In this configuration, some wires of the tensile armour 5 are omitted for positioning the collecting or injection pipes.

Figure 8:
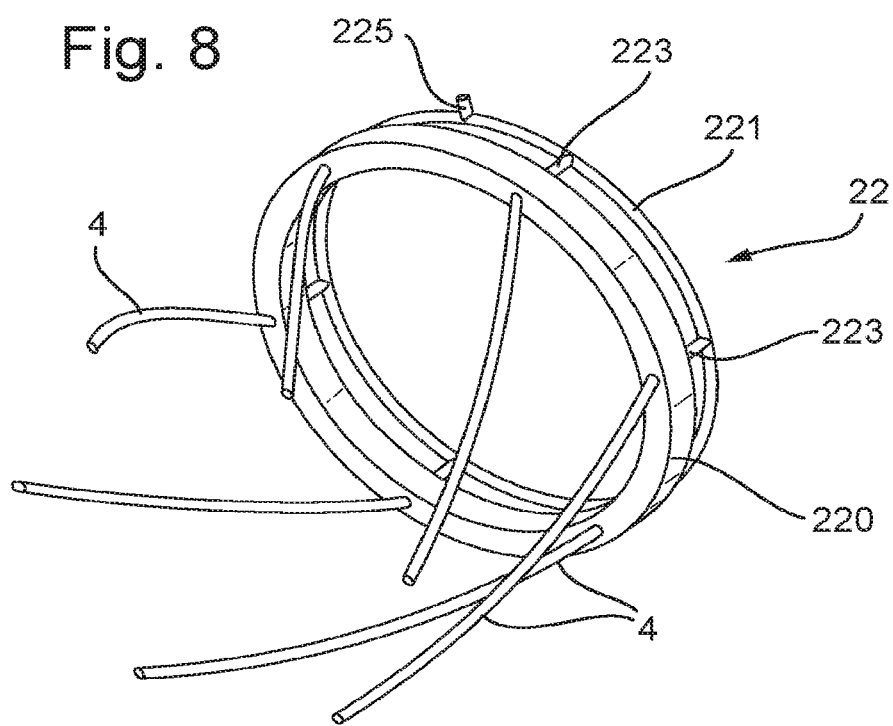
FIG. 8 shows a view of a second optional configuration of a distributing ring without access to the annulus.

FIG. 8 shows a view of a second optional configuration of a distributing ring 22 without access to the annulus 30 that comprises a main annular chamber 220 connected fluidically via small ducts 223 to an auxiliary annular chamber 221. A channel 225 is provided for communication with the second manifold 12 and at least one injection pipe 4 is connected to one face.

In this configuration, the channel 225 for communication with the second manifold 12 is positioned in the auxiliary annular chamber 221 and this communicates with the main annular chamber 220 via small ducts 223. Preferably, a plurality of collecting or injection pipes are connected to an exposed face of the main annular chamber 220.

Figure 8A:
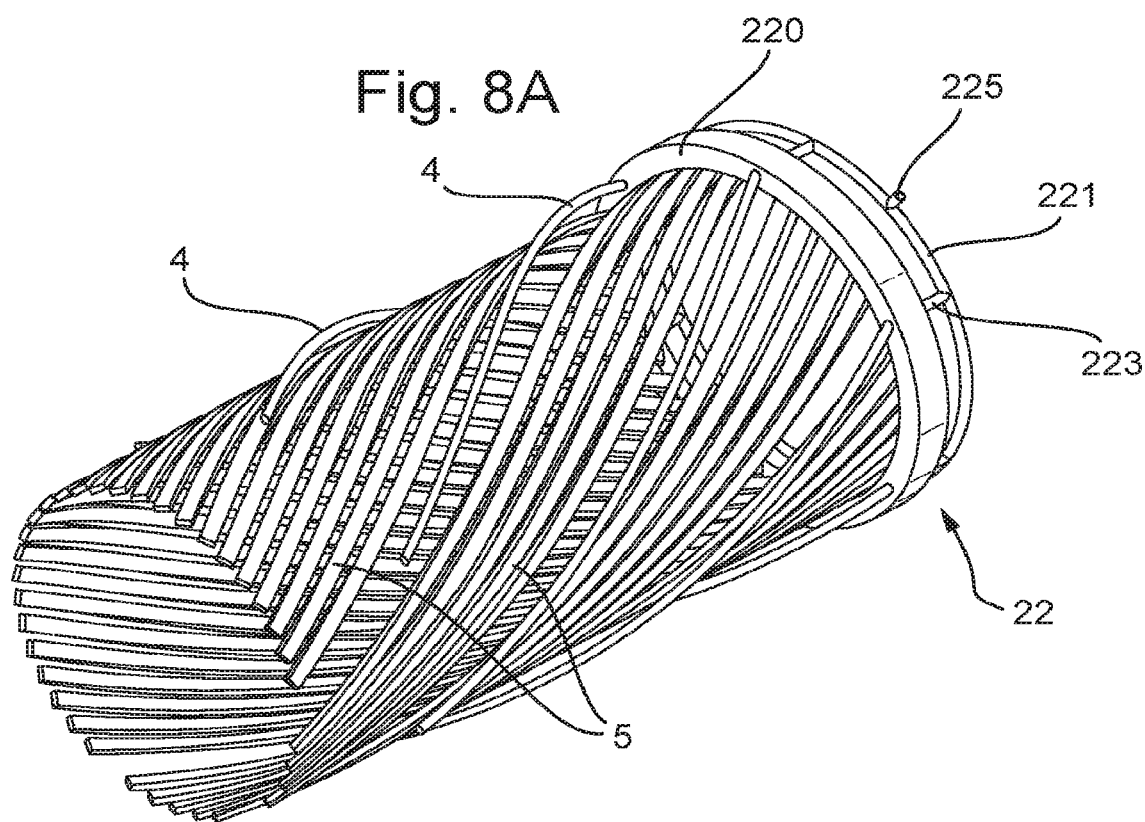
FIG. 8A shows a view of the distributing ring without access to the annulus of FIG. 8 in an optional application.

FIG. 8A shows a view of the distributing ring 22 without access to the annulus 30 in FIG. 8 in an optional application in which the pipes for injection or collection are distributed helicoidally along the tensile armour 5 of the flexible pipe. In this configuration, some wires of the tensile armour 5 are omitted for positioning the collecting or injection pipes.

Figure 9:
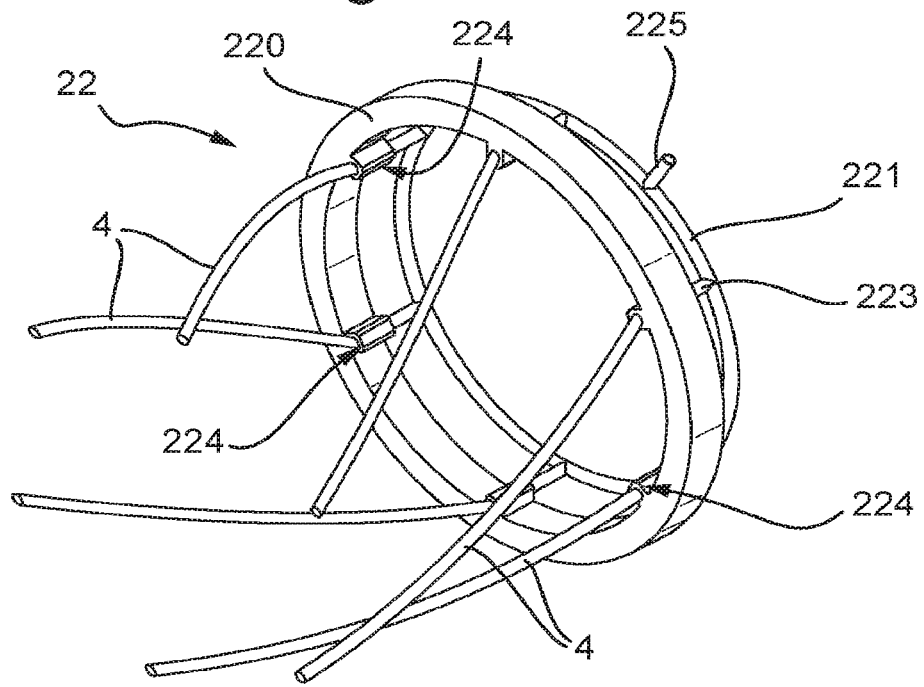
FIG. 9 shows a view of a third optional configuration of a distributing ring without access to the annulus.

FIG. 9 shows a view of a third optional configuration of a distributing ring 22 without access to the annulus 30 that comprises a main annular chamber 220 connected fluidically via small ducts 223 to an auxiliary annular chamber 221, a channel 225 for communication with the second manifold 12 and at least one injection pipe 4 connected to at least one extension 224 of the main chamber 220.

In this configuration, channel 225 for communication with the second manifold 12 is positioned in the auxiliary annular chamber 221, and this communicates with the main annular chamber 220 via small ducts 223. Preferably, a plurality of collecting or injection pipes are connected to an exposed face of the main annular chamber 220.

Figure 9A:
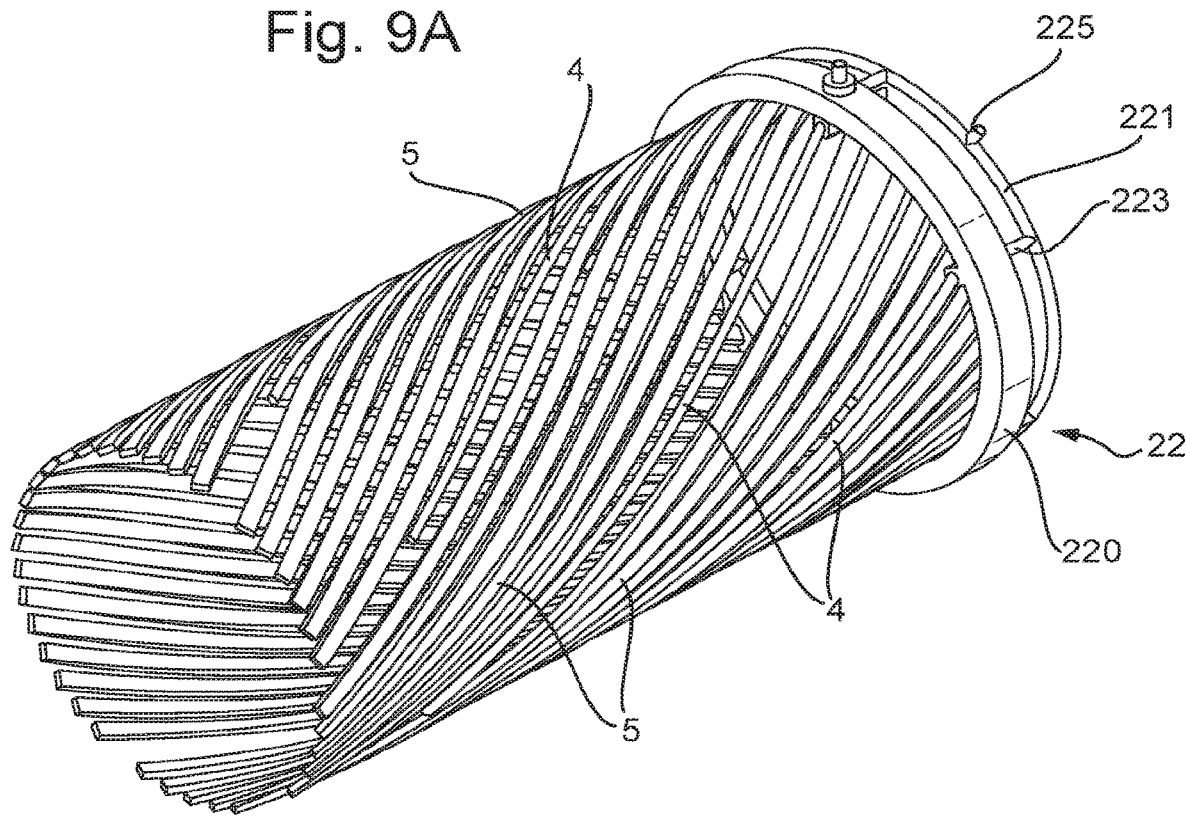
FIG. 9A shows a view of the distributing ring without access to the annulus of FIG. 9 in an optional application.

FIG. 9A shows a view of the distributing ring 22 without access to the annulus 30 of FIG. 9 in an optional application in which the pipes for injection or collection are distributed helicoidally along the tensile armour 5 of the flexible pipe. In this configuration, some wires of the tensile armour 5 are omitted for positioning the collecting or injection pipes.

It can be seen in this figure that, owing to the extension 224 of the main chamber 220, the collecting or injection pipes are inserted even more internally to the wires of the tensile armour 5.

Figure 10:
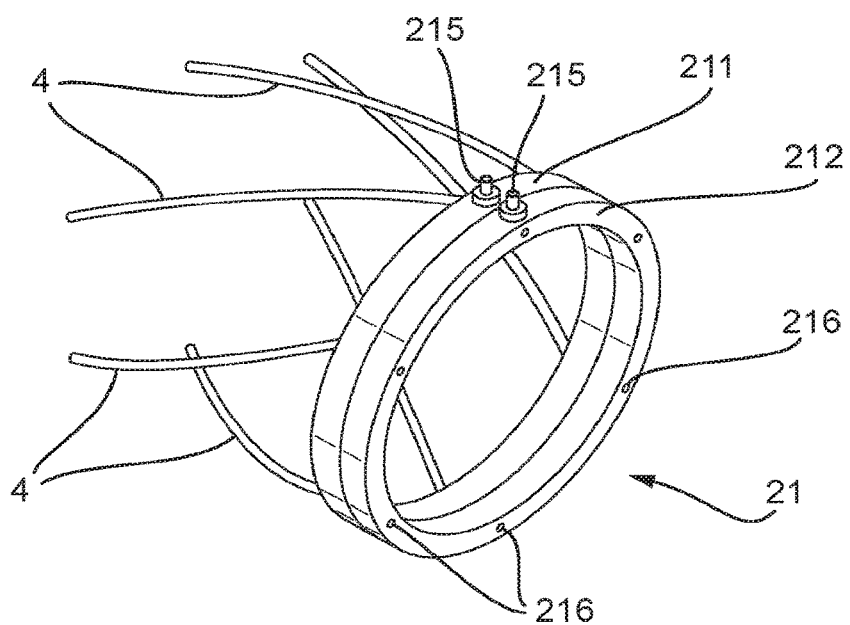
FIG. 10 shows a view of a first optional configuration of a distributing ring with access to the annulus.

FIG. 10 shows a view of a first optional configuration of a distributing ring with access to the annulus 30, in which the distributing ring 21 with access to the annulus 30 comprises two annular chambers 211, 212.

The first annular chamber 211 is in fluid communication with at least one collecting or injection pipe 4, and with the first manifold 11 via a channel 215 for communication with the first manifold 11.

In addition, the first annular chamber 211 comprises a fluidic communication channel 8 that is connected to a distributing ring 22 without access to the annulus 30 of an adjacent connector. This feature is not shown in this figure, but is shown and described in FIGS. 4 and 5.

The second annular chamber 212 is in fluid communication with the first manifold 11, via a channel 215 for communication with the first manifold 11, and in fluid communication with the annulus of the flexible pipe via holes 216 in one face.

Figure 10A:
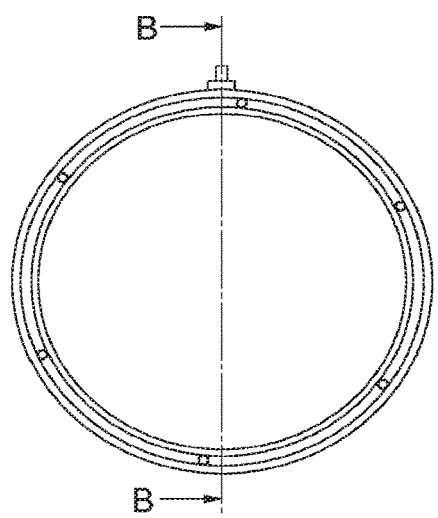
FIG. 10A shows a front view of the distributing ring without access to the annulus of FIG. 10.

FIG. 10A shows a front view (face that comprises the holes 216 for fluid communication with the annulus) of the distributing ring 22 without access to the annulus 30 in FIG. 10.

Figure 10B:
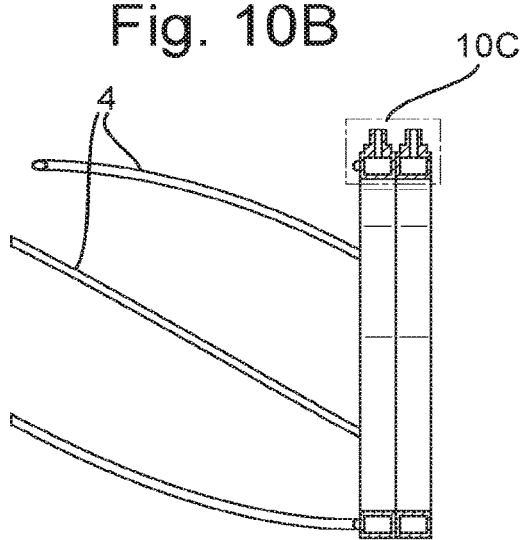
FIG. 10B shows a view of section BB of the distributing ring with access to the annulus indicated in FIG. 10A.
Figure 10C:
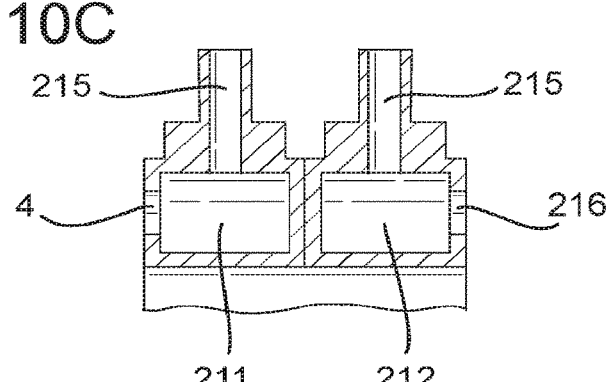
FIG. 10C shows a view of detail 10C of FIG. 10B.

FIG. 10B shows a view of section BB of the distributing ring 21 with access to the annulus 30 indicated in FIG. 10A, and FIG. 10C shows a view of detail 10C from FIG. 10B.

The rectangular format of the cross-section of the annular chambers 211,212 can be seen more clearly in these figures. It is emphasized that other formats may be employed, such as round, oval, etc.

It can also be seen that the first chamber 211 and the second chamber 212 comprise a barrier between them, which prevents fluid communication between these chambers.

Figure 10D:
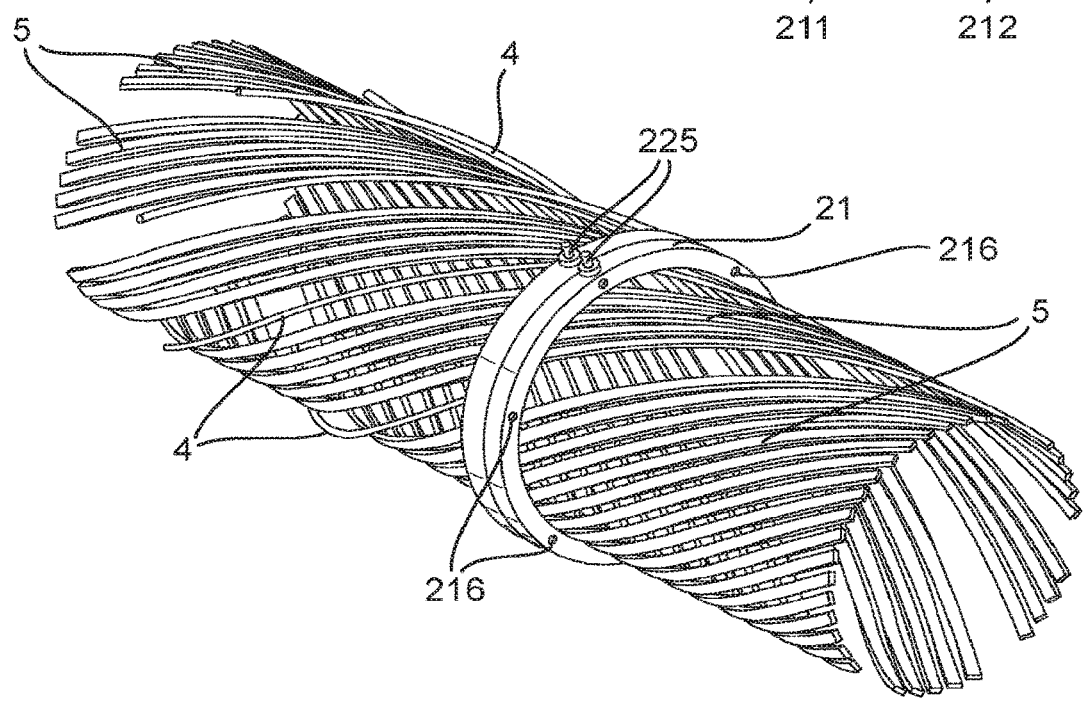
FIG. 10D shows a view of the distributing ring with access to the annulus of FIG. 10 in an optional application.

FIG. 10D shows a view of the distributing ring with access to the annulus 21 in FIG. 10 in an optional application in which the pipes for injection or collection are distributed helicoidally along the tensile armour 5 of the flexible pipe. In this configuration, some wires of the tensile armour 5 are omitted for positioning the collecting or injection pipes.

It will thus be understood that the system of manifolds 11,12, distributor rings 21, 22, pipes 4, channels 8 and e.g. holes 216 allows for the circulation of the corrosion-inhibiting fluid to be controlled as required. The fluid can be passed from pipe segment to pipe segment, and can be circulated through the annulus of one or segments as circumstances dictate.

Figure 11:
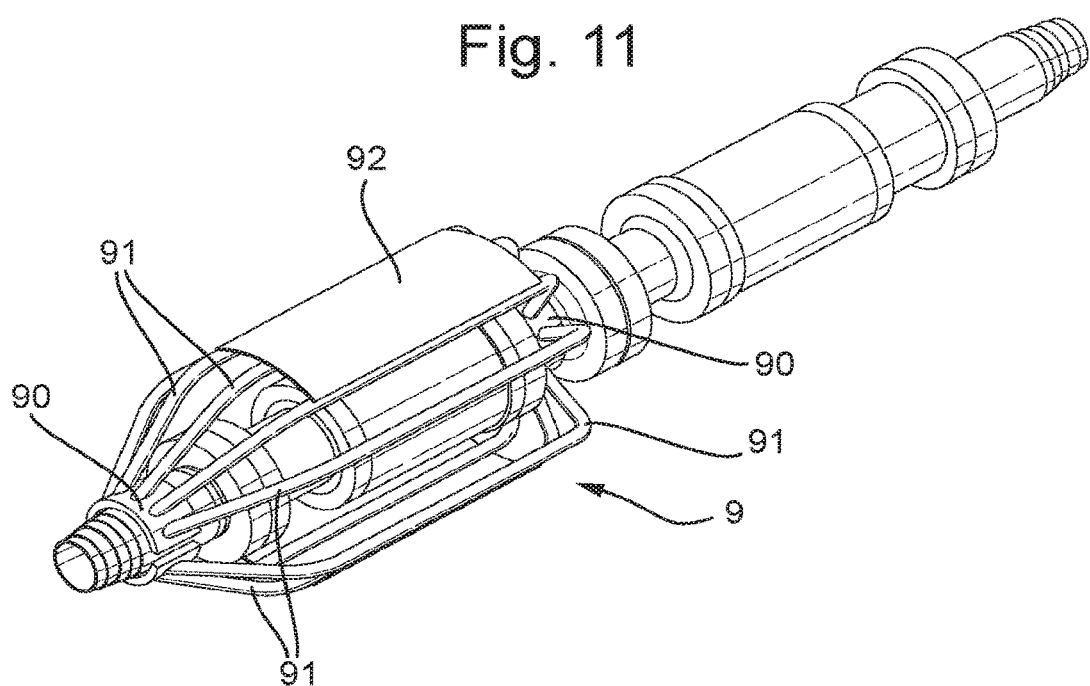
FIG. 11 shows a view of a flexible pipe connector with a protective element of the connector according to a first optional configuration.

FIG. 11 shows a view of a flexible pipe connector with a protective element of the connector according to a first optional configuration of the present invention. In this configuration, the protective element 9 comprises a clamping ring 90 fixed to the end of the flexible pipe near the connector, and a clamping ring 90 fixed to the opposite end of the connector. To achieve protection, the clamping rings are connected by means of protecting bars 91 that are distant from the connector.

Figure 12:
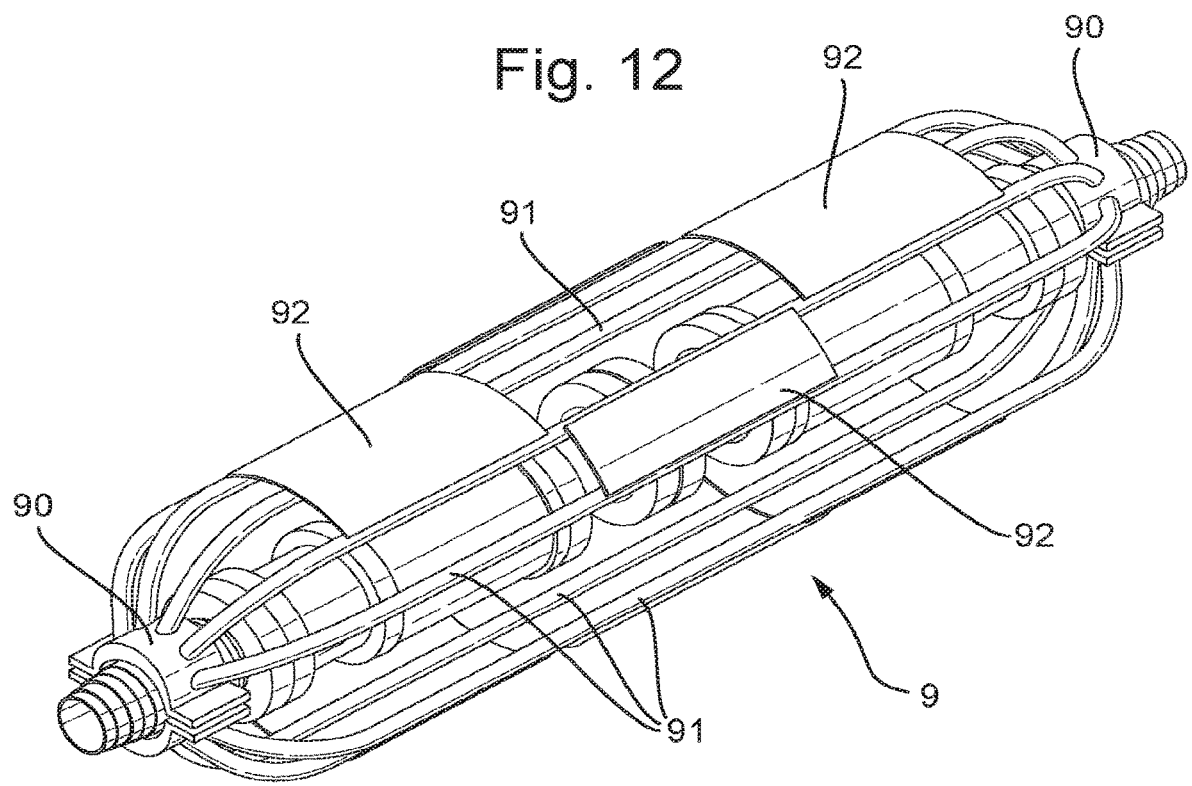
FIG. 12 shows a view of a flexible pipe connector with a protective element of the connector according to a second optional configuration.

FIG. 12 shows a view of a flexible pipe connector with a protective element 9 of the connector according to a second optional configuration of the present invention. In this configuration, the protective element 9 comprises a clamping ring 90 fixed to the end of the flexible pipe near the connector, and a clamping ring 90 fixed to the end of the flexible pipe near the connector exactly adjacent to the first. To achieve protection, the clamping rings are also connected by means of protecting bars 91 that are distant from the connector The format and arrangement of the protecting bars 91, as well as the distance of their spacing from the connector, may vary depending on the application. These features may be further defined for each application.

In addition, plates 92 for laying on the seabed may be fixed, preferably externally, on the protecting bars 91. These plates 92 provide better laying of the connectors on the seabed, minimizing the effect of sinking in the sand due to the movement of the water and the connector itself. In addition, these plates 92 provide greater protection against various impacts, acting as a shield for the connector.

Figure 13:
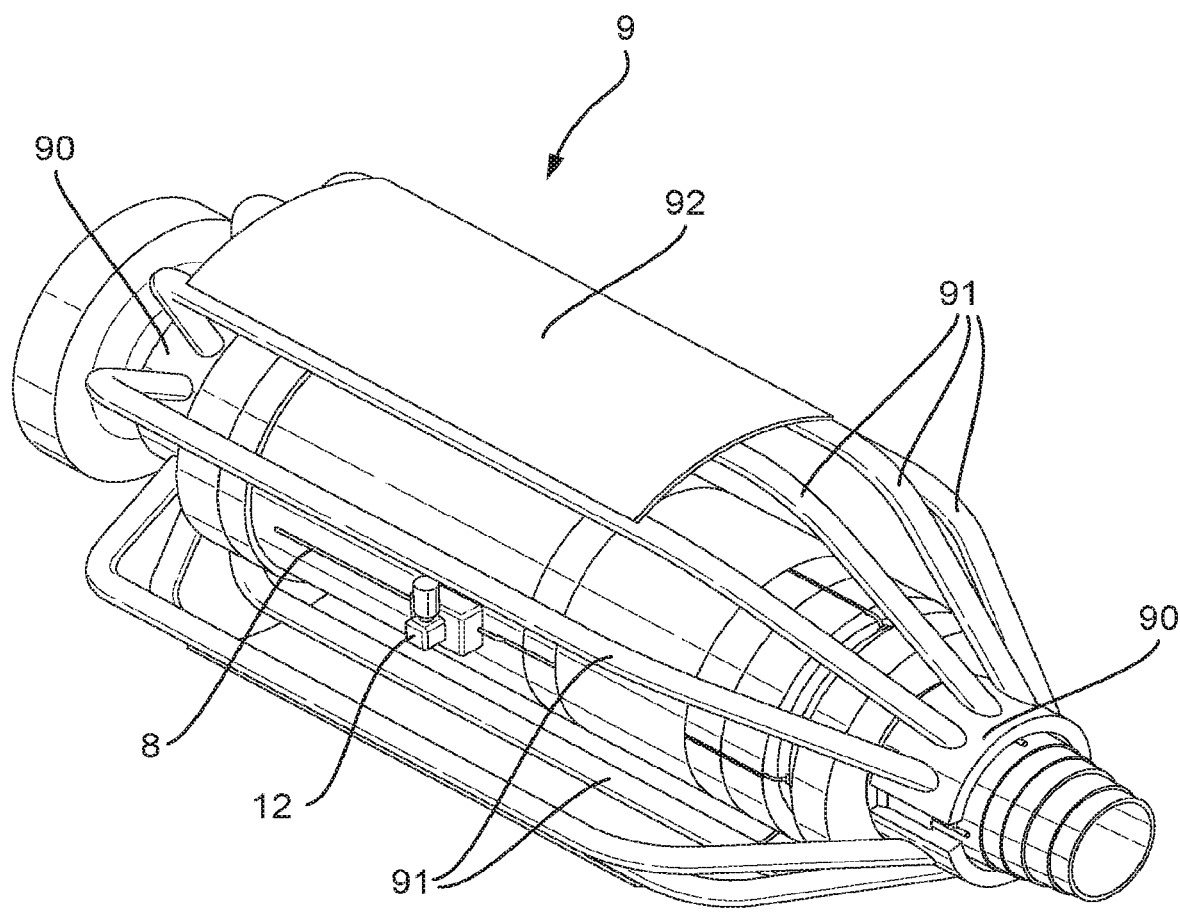
FIG. 13 shows a view from a different angle, of the flexible pipe connector with a protective element from FIG. 11.

FIG. 13 shows a view from a different angle, of the flexible pipe connector with a protective element shown in FIG. 11, in which it can be seen that the protector 9 is adapted to provide access to the manifold 11,12. In other words, it is not necessary for a plate 92 for laying on the seabed to be positioned on a manifold 11,12. This feature is important, to facilitate access of a ROV or a technician to this element if necessary (maintenance, or any kind of inspection).

In addition to everything that has been described above, a number of features and elements are envisaged in other optional configurations of the present invention.

It is also envisaged that the connectors comprise at least one pressure control valve, associated with at least one flow control valve, suitable for providing communication between the annulus and the collecting or injection pipes independently for each segment of flexible pipe.

These pressure control valves may be capable of regulating the flow of recirculated fluid so that the injection pressure does not exceed the breaking strength of the outer sheath of the flexible pipe.

Optionally, the connector may comprise at least one visual indicator, with automatic operation, calibrated for the pressure of the sheet of water in the application, for the purpose of visual indication of loss of hermeticity of the annulus.

Also optionally, the connector described may contain a blocking valve actuatable by ROV, which may only be opened after confirmation of the hermeticity and integrity of the pipe before commencing operation of the flexible pipe. The purpose of this valve is to prevent flooding of the annulus, if the pipe 4 (collecting or injection pipe) is damaged during installation. Another option for the collecting pipes is installation of a one-way valve (check valve), without the need for the operation of opening by ROV.

To facilitate access to the valves and actuation thereof by ROV, for example in the case of connections between segments of flexible pipes laid on the seabed, a float or a protector 9 (such as those described in FIGS. 11, 12, and 13) may be installed on the connector, to keep the connector away from the sea floor.

Optionally, for carrying out tests on the flexible pipe, a fusible valve system may be employed in the connector. In this configuration, if the pipe is approved in the test of integrity immediately after installation of the flexible pipe, the fusible valve would be configured to open only starting from a pre-determined pressure level, giving access to the annulus of the riser. If flooding of the pipe occurs during installation, the fusible valve would prevent flooding of the annulus.

Therefore it is clear that the above disclosure solves the problems of the prior art as proposed, in particular by providing a flexible pipe connector that allows displacement of water vapour that has permeated to the annulus of the flexible pipe, $CO_2$, $H_2S$ and bubbles or droplets of $CO_2$, trapped in the metal armour, in the polymer layers, at the interfaces and interstices of the connector and of the layers, and between layers of the annulus of the flexible pipe Thus, the connector reduces the content of $CO_2$, $H_2S$, or any other corrosive element dissolved in the aqueous phase, through forced circulation of corrosion-inhibiting fluids through said annulus. The corrosion-inhibiting fluid used can be $N_2$.

The connector also provides control and access to the annulus of the flexible pipe, so as to allow forced circulation of fluids and reduction of the concentration of corrosive gases such as $CO_2$ and $H_2S$ in the water in case of flooding of the annulus with water, as well as removing or breaking the bubbles or droplets of $CO_2$ with dissolved water, which may be trapped in the metal armour, in the polymer layers, at the interfaces and interstices of the connector and of the layers or between layers of the annulus of the flexible pipe.

Countless variations falling within the scope of protection of the present application are permitted. This reinforces the fact that the present invention is not limited to the particular configurations/embodiments described above. As such, modifications of the above-described apparatuses and methods, combinations between different variations as practicable, and variations of aspects of the invention that are obvious to those of skill in the art are intended to be within the spirit and scope of the claims.

The invention claimed is:

1. Flexible pipe connector for effecting control and forced circulation of corrosion-inhibiting fluids through an annulus between inner and outer sheaths of a flexible pipe comprising multiple connected segments, the flexible pipe connector comprising:
   at least two distributing rings for distributing corrosion-inhibiting fluid, the at least two rings positioned in an annular space of the flexible pipe connector and aligned with the annulus of the flexible pipe;
   wherein at least one first distributing ring has fluidic access to the annulus of the flexible pipe, the at least one first distributing ring being configured to be connected fluidically to at least one third distributing ring in an adjacent connector that does not have fluidic access to a second flexible pipe annulus of the adjacent connector; and
   at least one second distributing ring that does not have fluidic access to the annulus of the flexible pipe, the at least one second distributing ring being configured to be connected fluidically to at least one fourth distributing ring in the adjacent connector that comprises fluidic access to the second flexible pipe annulus of the adjacent connector.

2. The flexible pipe connector according to claim 1, further comprising:
   a first manifold configured to control the flow of corrosion-inhibiting fluid to or through the at least one first distributing ring of the flexible pipe connector having fluidic access to the annulus of the flexible pipe; and
   a second manifold configured to control the flow of corrosion-inhibiting fluid to or through the at least one second distributing ring of the flexible pipe connector that does not have fluidic access to the annulus of the flexible pipe.

3. The flexible pipe connector according to claim 2, wherein the at least first distributing ring of the flexible pipe connector that comprises access to the annulus comprises two annular chambers, wherein:
   a first annular chamber is configured to be in fluid communication with: a fluidic communication channel that is configured to be connected to the adjacent connector; at least one collecting or injection pipe; and the first manifold; and a second annular chamber is configured to be in fluid communication with: the first manifold; and with the annulus of the flexible pipe via holes in one face.

4. The flexible pipe connector according to claim 2, wherein: the second manifold of the flexible pipe connector comprises channels configured for fluidic communication with a first manifold of the adjacent connector; and the first manifold of the flexible pipe connector comprises channels configured for fluidic communication with a second manifold of the adjacent connector.

5. The flexible pipe connector according to claim 2, wherein the first and second manifolds of the flexible pipe connector are actuatable by a remotely operated underwater vehicle.

6. The flexible pipe connector according to claim 2, wherein the at least one second distributing ring of the connector that does not have access to the annulus comprises an annular chamber, a communication channel with the second manifold of the flexible pipe connector, and one or more of: at least one injection pipe connected to one face; at least one collecting pipe connected to one face; ducts fluidically connecting the annular chamber of the at least one second distributing ring to an auxiliary annular chamber; and at least one collecting or injection pipe connected to at least one extension of the annular chamber of the at least one second distributing ring, wherein the collecting or injection pipes are distributed helicoidally along a tensile armor of the flexible pipe.

7. The flexible pipe connector according to claim 1, wherein the at least one second distributing ring of the flexible pipe connector that does not have access to the annulus of the flexible pipe is in fluid communication with two fluidic communication channels, which are configured for fluidic communication with two adjacent flexible pipe connectors.

8. The flexible pipe connector according to claim 1, further comprising an access hatch.

9. The flexible pipe connector according to claim 8, further comprising a removable cover for the access hatch.

10. The flexible pipe connector according to claim 1, further comprising at least one access channel for injection or collection of corrosion-inhibiting fluid inside said flexible pipe connector.

11. The flexible pipe connector according to claim 1, further comprising a protective element that includes one of a group consisting of:
    a first clamping ring configured to be fixed to an end of the flexible pipe adjacent the flexible pipe connector, and a second clamping ring fixed to an opposite end of the flexible pipe connector; and
    a first clamping ring configured to be fixed to the end of the flexible pipe adjacent the flexible pipe connector, and a second clamping ring configured to be fixed to an end of a flexible pipe adjacent the adjacent connector;
    wherein the clamping rings are connected via protecting bars distant from the flexible pipe connector, and plates for laying on a seabed are fixed on protecting bars.

12. Method of connecting segments of flexible pipe to effect control and forced circulation of corrosion-inhibiting fluids through an annulus between inner and outer sheaths of the flexible pipe, the method comprising:
    attaching an end of a segment of flexible pipe to a first connector, including positioning two distributing rings of the first connector, for distributing corrosion-inhibiting fluid, in an annular space of the flexible pipe connector aligned with the annulus of the flexible pipe segment, the two distributing rings comprising a first distributing ring and a second distributing ring;
    wherein the first distributing ring has fluidic access to the annulus of the flexible pipe, and the method further comprises connecting the first distributing ring fluidically to a third distributing ring in an adjacent connector, the third distributing ring in the adjacent connector not having fluidic access to a second flexible pipe annulus of the adjacent connector; and
    wherein the second distributing ring does not have fluidic access to the annulus of the flexible pipe, and the method further comprises connecting the second distributing ring fluidically to a fourth distributing ring in the adjacent connector, the fourth distributing ring in the adjacent connector having fluidic access to a second flexible pipe annulus of the adjacent connector.

* * * * *